(12) United States Patent
Muhammad

(10) Patent No.: US 10,906,381 B1
(45) Date of Patent: Feb. 2, 2021

(54) AUTOMATIC SUN VISOR

(71) Applicant: Oraby M. Muhammad, Waltham, MA (US)

(72) Inventor: Oraby M. Muhammad, Waltham, MA (US)

( * ) Notice: Subject to any disclaimer, the term of this patent is extended or adjusted under 35 U.S.C. 154(b) by 227 days.

(21) Appl. No.: 16/049,219

(22) Filed: Jul. 30, 2018

(51) Int. Cl.
| | |
|---|---|
| *B60J 3/00* | (2006.01) |
| *B60J 3/02* | (2006.01) |
| *B60J 3/04* | (2006.01) |
| *B60R 7/00* | (2006.01) |
| *B60R 7/05* | (2006.01) |
| *G01J 1/42* | (2006.01) |

(52) U.S. Cl.
CPC ........... *B60J 3/0204* (2013.01); *G01J 1/4204* (2013.01); *G01J 2001/4266* (2013.01)

(58) Field of Classification Search
CPC ....... B60J 3/00; B60J 3/02; B60J 3/005; B60J 3/0204; B60J 1/00; B60J 1/4204; B60J 3/04; G02B 2/00; G02B 2/01; H02S 40/34; H02S 40/38; H02S 20/30; H02J 7/35; Y02E 10/90; B60R 7/00; B60R 7/05
See application file for complete search history.

(56) References Cited

U.S. PATENT DOCUMENTS

| | | | | | |
|---|---|---|---|---|---|
| 4,874,938 | A | * | 10/1989 | Chuang | B60J 3/0208 250/203.4 |
| 5,201,563 | A | * | 4/1993 | Liao | B60J 1/2011 160/35 |
| 5,292,168 | A | * | 3/1994 | Mykytiuk | B60J 3/02 296/97.4 |
| 5,298,732 | A | * | 3/1994 | Chen | G01S 3/7864 250/203.4 |
| 5,947,544 | A | * | 9/1999 | Hubeshi | B60J 1/2019 160/23.1 |
| 6,318,788 | B1 | * | 11/2001 | Jaurigue | B60J 3/02 296/97.4 |
| 7,216,917 | B2 | * | 5/2007 | Tadakamalla | B60J 1/2016 296/97.11 |
| 8,162,376 | B1 | | 4/2012 | Grossmith | |
| 8,392,074 | B2 | | 3/2013 | Zeng et al. | |
| 2003/0103590 | A1 | * | 6/2003 | Budde | H04L 1/0061 375/355 |
| 2007/0222252 | A1 | * | 9/2007 | Suzuki | B60J 3/0204 296/97.8 |
| 2018/0083480 | A1 | * | 3/2018 | Burton | H02S 40/38 |

* cited by examiner

*Primary Examiner* — Yonel Beaulieu
(74) *Attorney, Agent, or Firm* — Sanchelima & Associates, P.A.; Christian Sanchelima; Jesus Sanchelima

(57) ABSTRACT

A sun visor assembly used in a vehicle is disclosed. The sun visor assembly comprises a sun visor having at least one light intensity sensor for detecting sunlight or light intensity entering the vehicle. The sun visor further comprises a microprocessor for receiving a signal indicating detection of the light intensity entering the vehicle from the light intensity sensor. The sun visor further comprises at least one motor operatively coupled to the microprocessor. In response to the signal, the microprocessor instructs the at least one motor to position the sun visor to block the sunlight or light intensity sensor entering the vehicle.

10 Claims, 5 Drawing Sheets

AUTOMATIC SUN VISOR

BACKGROUND OF THE INVENTION

1. Field of the Invention

The present disclosure generally relates to a sun visor provided in a vehicle. More specifically, the present disclosure generally relates a sun visor provided in a vehicle that can be operated automatically for blocking sunlight falling on face of a passenger in the vehicle.

2. Description of the Related Art

It is known that a vehicle needs to be operated with a clear and unimpaired view, Sunlight, particularly at early in the morning or in the evening may distract a driver of the vehicle. Difficulties caused due to the sunlight may blind the driver temporarily, or cause pain or irritation to eyes of the driver or passengers in the vehicle.

Typically, the vehicle is provided with a sun visor to block sunlight falling on face of the driver or the passenger. The sun visor is provided in the interior of the vehicle i.e., at top of windshield or at roof of the vehicle, at a windshield. Typically, the driver or the passenger operates the sun visor manually. Specifically, the sun visor is operated either by folding the sun visor or positioning the sub visor such that the sunlight falling on face of the driver or the passenger is blocked. Further, it is known that the sun visor may also pivot with respect to the longitudinal axis of the vehicle so that the driver or the passenger can use the sun visor to block sunlight that is shining from a side door window of the vehicle. It is to be understood that the driver or the passenger has to operate the sun visor manually to block the sunlight coming from either from front or side of the vehicle.

It is not particularly easy to operate the sun visor by the driver while driving the vehicle. Further, if the driver is driving the vehicle and the sunlight is falling on face from the windshield at vehicle's passenger side or side door, then it is difficult for the driver to operate the sun visor provided at vehicle's passenger side.

In order to overcome the drawbacks of the sun visors that are operated manually, several attempts were in the past to operate the sun visors automatically. One such example was disclosed in a United States granted patent U.S. Pat. No. 8,162,376. In U.S. Pat. No. 8,162,376, an electrically deployable sun visor assembly for use on motor vehicles is disclosed. The sun visor is wired to the electrical system of the vehicle and the sun visor is made to retract upward and deploy downward upon a track system, are located on the front windshield and alternately on the side window. The sun visor is operated by a motor-operated gear system wired into the electrical system of the motor vehicle. The sun visor is operated using a dash-mounted switch. The amount of the sun visor to be deployed is controlled by holding the switch in either an up or down position for the necessary period of time similar to an electrically operated window.

It should be noted that the above solution has several drawbacks. For example, the sun visor is controlled manually using the dash-mounted switch. Further, the driver or the passenger has to hold the dash-mounted switch for certain period of time to position the sun visor. Controlling the sun visor with the help of the dash-mounted switch is a time-consuming task and is not a viable solution.

Another example is disclosed in a United States granted patent U.S. Pat. No. 8,392,074. In U.S. Pat. No. 8,392,074, a system uses GPS and solar almanac data to determine the location of the sun relative to the vehicle, driver side view mirror angle data to determine the position of the driver's eyes within the vehicle, and an existing outside light metering device to determine whether the sun is actually shining on the vehicle, to calculate the optimum position of the sun visor. Further, the system uses images obtained from a camera in the vehicle to improve the estimate of the sun position relative to the vehicle.

It should be noted that the above solution is data intensive and if the GPS data is non-continuous, then the system will not have accurate data for calculating the optimum position of the sun visor to block the sunlight falling on the face of the driver.

Other documents describing the closest subject matter provide for a number of more or less complicated features that fail to solve the problem in an efficient and economical way. None of the patents suggest the novel features of the present invention.

Therefore, there is a need in the art for a sun visor that can be operated automatically without intervention of the driver or the passenger.

SUMMARY OF THE INVENTION

It is one of the main objects of the present invention to provide a sun visor that can be operated automatically that avoids the drawbacks of the prior art.

It is one object of the present invention to provide a sun visor that blocks the sunlight or light intensity entering a vehicle from a driver or passenger side window and a driver or passenger side front windshield.

It is one object of the present invention to provide a sun visor that adjusts automatically relative to the sunlight falling on face of a passenger in the vehicle.

It is one object of the present invention to provide a sun visor assembly comprising a sun visor for blocking sunlight or light intensity sensor entering a vehicle. The sun visor comprises a light intensity sensor, a microprocessor and at least one motor. The light intensity sensor detects sunlight or light intensity entering the vehicle. The microprocessor receives a signal indicating detection of the light intensity from the light intensity sensor. The at least one motor is operatively coupled to the microprocessor and the sun visor. In response to the signal, the microprocessor instructs the at least one motor to position the sun visor to block the light intensity entering the vehicle from a driver or passenger side window and a driver or passenger side front windshield.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a sun visor assembly provided in a vehicle. The sun visor assembly comprises a sun visor provided at a windshield or at an end of a roof of the vehicle. The sun visor comprises a light intensity sensor. Further, the sun visor comprises a microprocessor, at least one motor and at least one connecting rod. The light intensity sensor is used to detect sunlight or light intensity entering the vehicle from a driver or passenger side window and a driver or passenger side front windshield the light intensity sensor. The at least one motor is operatively coupled to the microprocessor and the sun visor. In response to the signal from the light intensity sensor, the microprocessor instructs the at least one motor to position the sun visor to block a predetermined light intensity entering the vehicle from a driver or passenger side window and a driver or passenger side front windshield.

Various features and embodiments of a sun visor assembly used for blocking the light intensity entering the vehicle from a driver or passenger side window and a driver or passenger side front windshield are explained in conjunction with the description of FIGS. 1-6.

Figure 1:
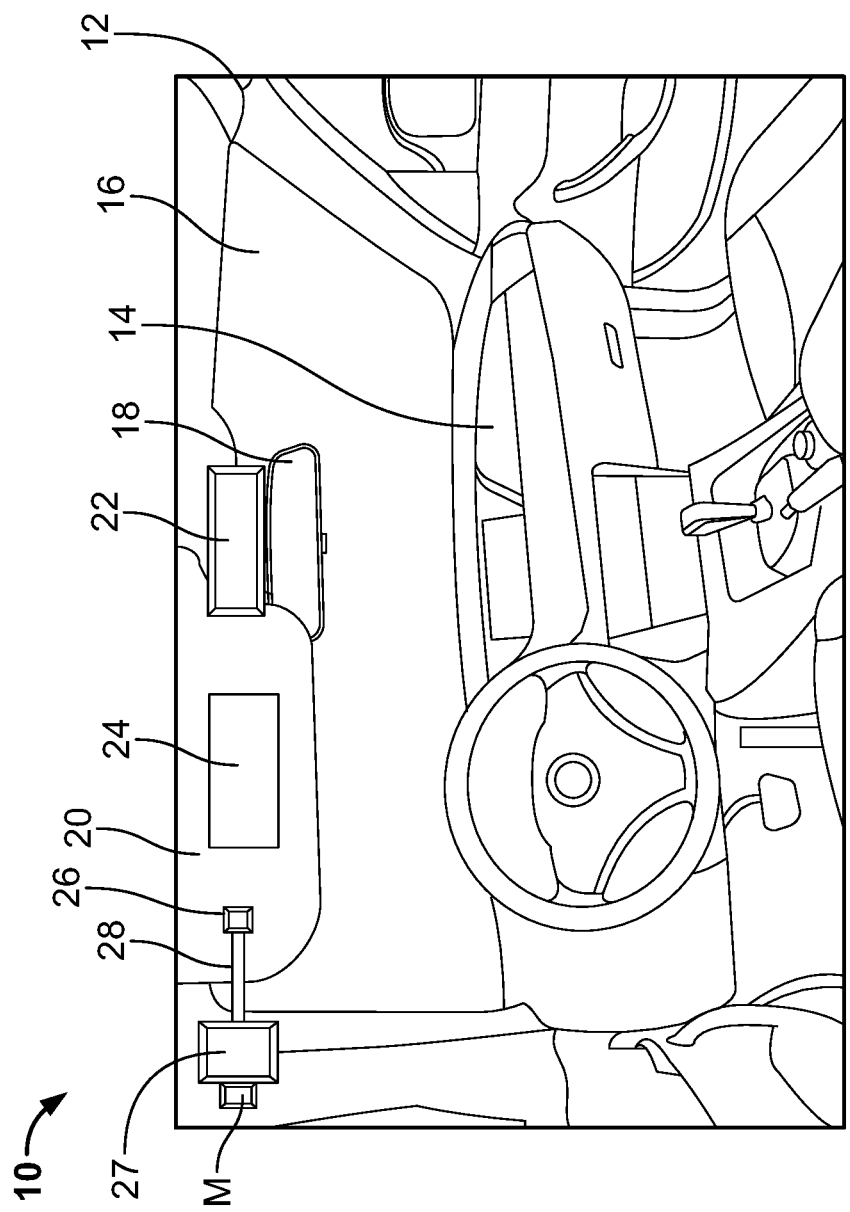
FIG. 1 illustrates a perspective view of a sun visor assembly from inside of a vehicle, in accordance with one embodiment of the present disclosure.

Referring to FIG. 1, a schematic diagram of a sun visor assembly 10 provided in a vehicle 12 is shown, in accordance with one embodiment of the present disclosure. The vehicle 12 may include, but not limited to, a car, a bus, a truck, and so on. The vehicle 12 comprises a dashboard 14 and a windshield 16. The sun visor assembly 10 comprises a rear view camera 18. In one implementation, the sun visor assembly 10 comprises a sun visor 20. The sun visor 20 may have a shape in which width is greater than its height, or vice versa. The sun visor 20 may rest against the surface of the windshield 16, or it may be formed inside of windshield 16. In another implementation, the sun visor 20 may be provided as an integral part of the vehicle 12 at a roof (not shown). The sun visor 20 may be removably coupled to the roof of the vehicle 12 using a hook (not shown) for support when not in use.

The sun visor 20 comprises a plurality of light intensity sensors 22 placed at the rood of the vehicle 12. In one example, the plurality of light intensity sensors 22 may include, but not limited to, a still camera, a video camera, a light sensor, a photometer sensor and so on which is capable of detecting light intensity on a surface. In the current implementation, the light intensity sensors 22 can sense the light entering the vehicle 12. In the present disclosure, the passenger may indicate a person driving the vehicle 12 or a person sitting at passenger's seat of the vehicle 12. The sun visor 20 comprises a microprocessor 24. The sun visor 20 further comprises a first motor 26 and a second motor 27 placed at the roof (not shown) of the vehicle 12. The first motor 26 may include a rotation motor. The second motor 27 may include a titling motor. In one example, the second motor 27 may be coupled to a mounting bracket M as shown in FIG. 1. In one example, the first motor 26 and the second motor 27 may include stepped motors. The speed of the first motor 26 and the second motor 27 may be pre-programmed by a user of the vehicle 12.

The sun visor 20 is coupled to the first motor 26 via a first connecting rod or a first shaft 28. Further, the second motor 27 is coupled to the sun visor 20 via a second connecting rod or a second shaft 29 (shown in FIG. 4). In one implementation, the first motor 26 may be coupled to a battery (not shown) of the vehicle 12 or by providing an auxiliary battery (not shown) to power the first motor 26. Similarly, the second motor 27 may be coupled to the battery of the vehicle 12 or by providing an auxiliary battery (not shown) to power the second motor 27. It should be understood that a single battery might be used to power the first motor 26 and the second motor 27.

In one example, the battery may be coupled to a voltage regulator (not shown). The battery may have capability to supply 12V. The voltage regulator may convert the 12V supplied by the battery to 5V. Subsequently, the voltage regulator may supply the 5V to the first motor 26 and the second motor 27.

Figure 2:
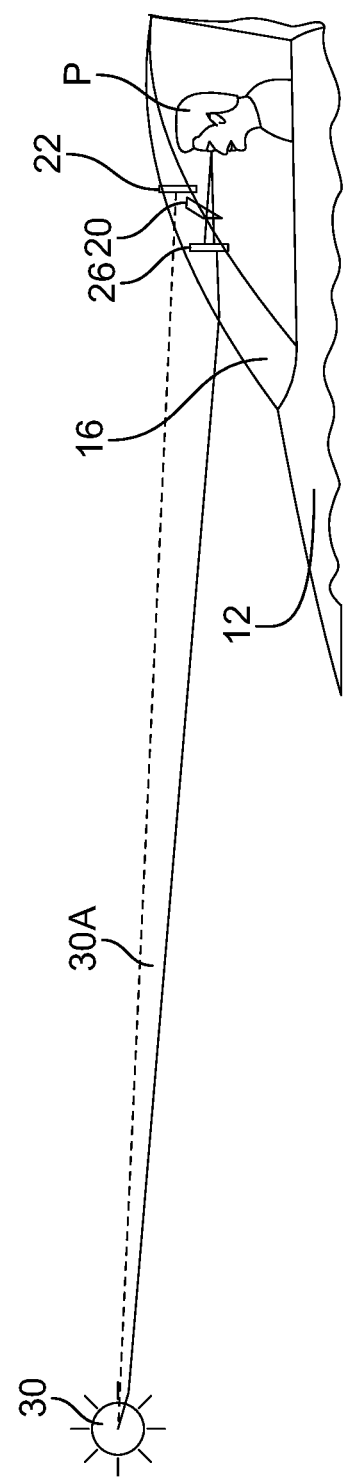
FIG. 2 illustrates a side view of the sun visor assembly in which sunlight is reaching the vehicle at a low angle, such as during sunrise or sunset, in accordance with one embodiment of the present disclosure.

Referring to FIG. 2, operational features of the sun visor assembly 10 is explained. As can be seen, the sun visor assembly 10 to cover the face of a passenger P is shown. Specifically, the sun visor assembly 10 covers the face of the passenger P when sun 30 sits low in the sky near the horizon directly or close to directly in front or side of the passenger P of a vehicle 12. When the sun 30 is at a low level, such as during sunrise or sunset, the light intensity may enter the vehicle 12 from a driver or passenger side window and a driver or passenger side front windshield 16.

Figure 3:
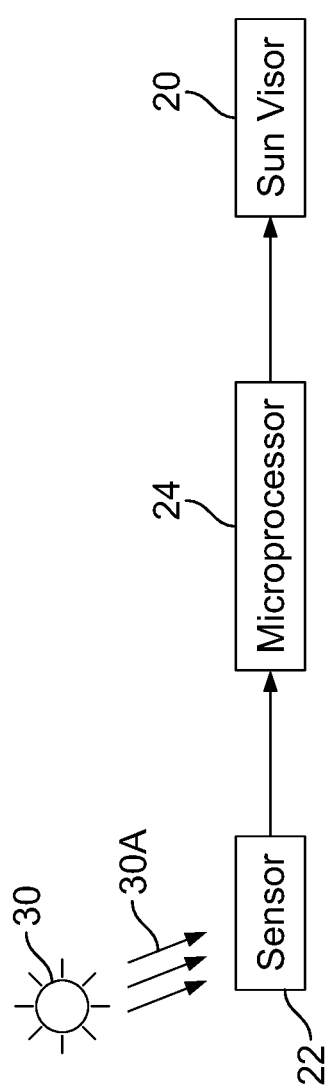
FIG. 3 illustrates a block diagram showing a method of detecting sunlight on face of a passenger and activating the sun visor, in accordance with one embodiment of the present disclosure.

Now referring to FIG. 3, a block diagram illustrating a method of detecting sunlight or light intensity enter the vehicle 12 from a driver or passenger side window and a driver or passenger side front windshield 16 in order to activate the sun visor is explained. For ease of explanation, like numerals designated in FIGS. 1 and 2 are used in FIG. 3. In one example, the light intensity sensors 22 may be provided at the windshield 16. In one embodiment, the plurality of light intensity sensors 22 may comprise at least two sensors, a first light intensity sensor (not shown) and a second light intensity sensor (not shown). In one example, the light intensity sensors 22 may be provided in a single housing (not shown). In another example, the first light intensity sensor and a second light intensity sensor may be provided separately. It should be understood that the first light intensity sensor might be provided facing forward such that the first light intensity sensor can detect light intensity entering from front of the vehicle 12. Further, the second light intensity sensor might be provided facing side wards i.e., side window such that the second light intensity sensor can detect light intensity entering from side of the vehicle 12. In addition, the plurality of light intensity sensors 22 may comprise a third light intensity sensor (not shown) at the passenger side window of the vehicle 12. The third light intensity sensor may be used to detect light entering the vehicle 12 from passenger side window.

When a predetermined light intensity 30A shines through windshield 16 or other windows e.g., side windows (not shown) of the vehicle 12, one of the plurality of light intensity sensor 22 signals the microprocessor 24 to activate the sun visor 20 such that the sun visor 20 lowers or tilts.

Specifically, one or more of the plurality of light intensity sensors 22 detects the predetermined light intensity 30A entering an interior of the vehicle 12. Upon detecting the light, e.g., consider the first light intensity sensor detects the light, then the first light intensity sensors 22 sends readings to the microprocessor 24 by a control signal (not shown). The control signal may indicate light intensity entering the vehicle. Subsequently, the microprocessor 24 instructs the first motor 26 to initiate such that the first connecting rod 28 is tilted in order to lower the sun visor 20 as shown in FIG. 1.

Figure 4:
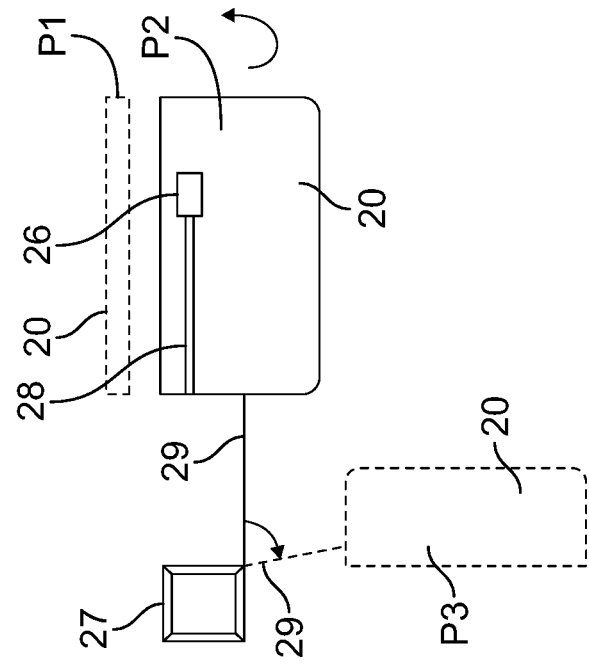
FIG. 4 illustrates the sun visor in different positions, in accordance with one embodiment of the present disclosure.

It should be noted that the first connecting rod 28 might rotate at about 90-degree axis to turn or swing the sun visor 20. Referring to FIG. 4, the sun visor 20 in a home position or folded position P1 when not in use i.e., when the light intensity sensors 22 detects that there is no sunlight on face of the passenger P is shown. In other words, the home position P1 of the sun visor 20 is a position in which the light intensity sensor 22 detects that there is no longer a programmed light intensity threshold coming from said driver or passenger side window and said driver or passenger side front windshield. Further, the sun visor 20 is lowered to an open position P2.

Similarly, when the light intensity sensor 22 e.g., the second light intensity sensor detects sunlight entering the vehicle from window side at the driver seat, then the microprocessor 24 signals the second motor 27 to operate such that the second connecting rod 29 is made to tilt and the sun visor 20 is lowered or opened to the open position P3. In other words, the second motor 27 is made to rotate in a rotational path adapted to follow an optimal path such that the sun visor 20 is faced to detect the predetermined light intensity entering through the driver or passenger side front of the windshield 16.

Further, the sun visor 20 is made to pivot with respect to the longitudinal axis of the vehicle i.e., to a side position P3 so that the sun visor 20 is used to block sunlight that is shining from a side door window of the vehicle 12. In order to tilt the sun visor 20 sideways, the microprocessor 24 signals the second motor 27 to operate such that the sun visor 20 is made to tilt sideways to the side position P3. Specifically, the second motor 27 is made to operate the second connecting rod 29 to bend at about 90 degrees such that the sun visor 20 is used to provide shade to the face of the driver P. In other words, the connecting rod 28 extending from the second motor 27 is actuated by the microprocessor 24. As a result, the second motor 27 is tilted such that the sun visor 20 tilts at a certain angular distance depending on programmed ranges that correlate with the positioning of the light intensity sensor to detect a predetermined light intensity entering through said driver or passenger side front windshield 16.

Figure 5:
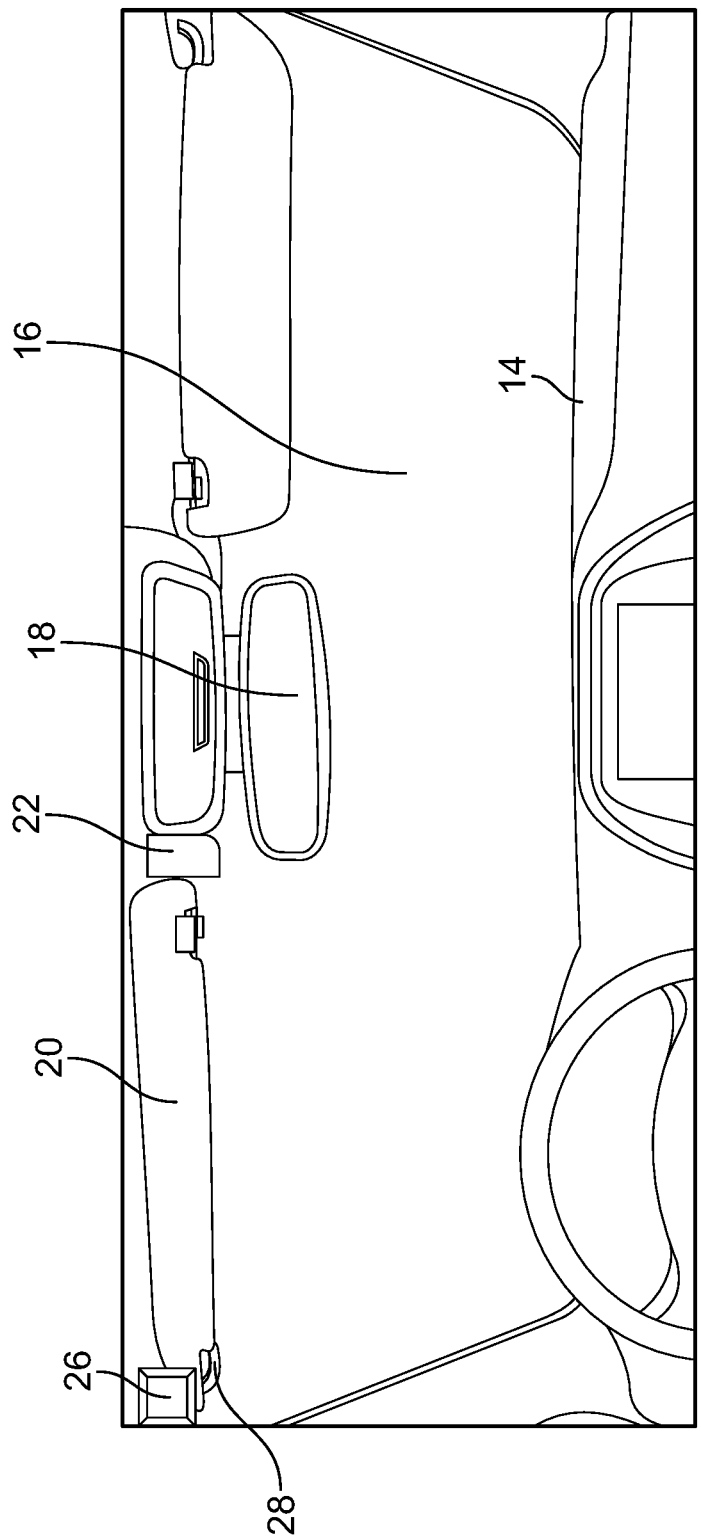
FIG. 5 illustrates a perspective view of the sun visor in a closed position, in accordance with one embodiment of the present disclosure.
Figure 6:
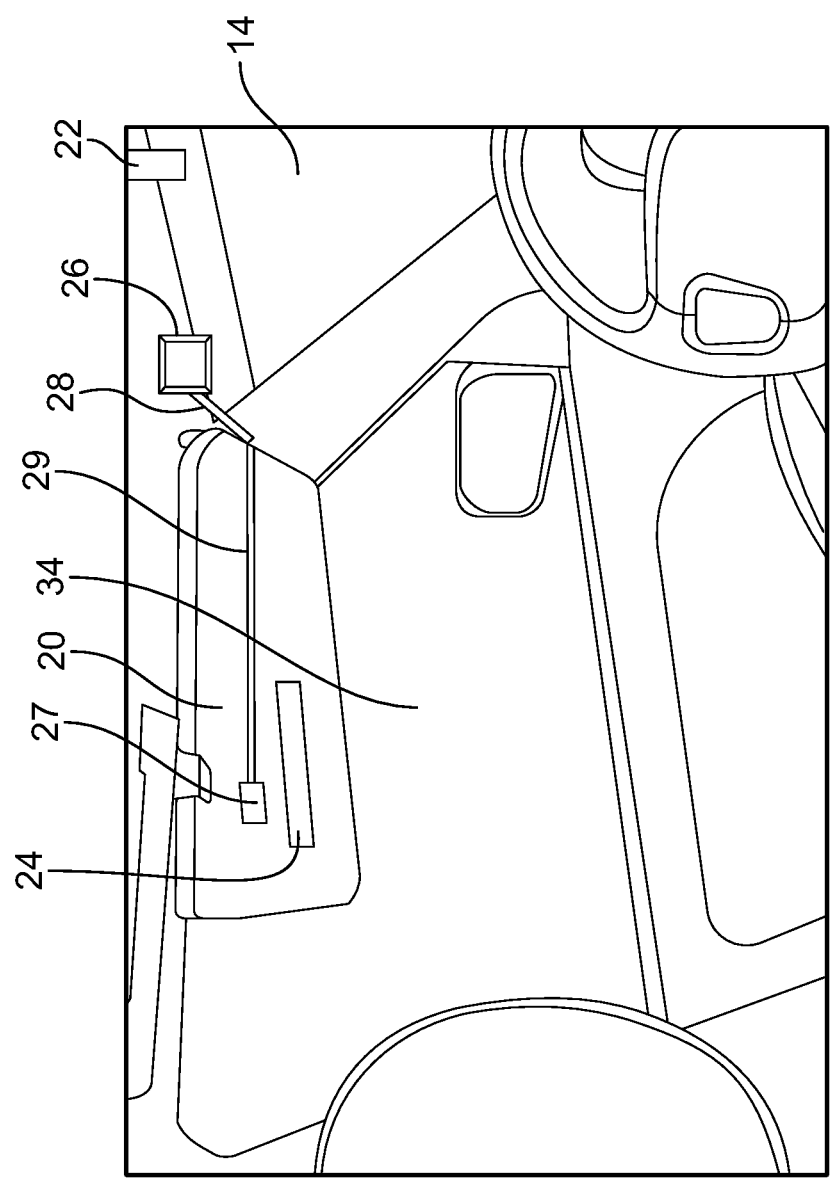
FIG. 6 illustrates a perspective view of the sun visor in a side position, in accordance with one embodiment of the present disclosure.

Referring to FIG. 5, the sun visor 20 in the home position or folded position P1 is shown. Referring to FIG. 6, the sun visor in a side position P3 i.e., in the longitudinal axis of the vehicle 12 is shown. It should be understood that the sun visor 20 comes in the side position P3 when the sunlight is falling on face of the passenger P3 from a side window 34 of the vehicle 12.

As explained above, the light intensity sensor 22 continuously tracks light intensity 30A entering the vehicle 12 from a driver or passenger side window and a driver or passenger side front windshield 16. When the light intensity sensor 22 detects the predetermined light intensity coming from driver or passenger side window and a driver or passenger side front windshield 16, the microprocessor 24 is activated. Upon activation, the microprocessor 24 instructs the first motor 26 or the second motor 27 to control the position of the sun visor 20. For example, when the light intensity sensor 22 sends the control signal indicating that the light intensity 30A is above a predetermined light intensity threshold, then the microprocessor 24 instructs the second motor 27 such that the second connecting rod 29 is made to rotate about 90 degrees so that the sun visor 20 is positioned (lowered and tilted) to block the light intensity 30A entering the vehicle 12 i.e., the side position P3, as shown in FIG. 6. Similarly, when the light intensity sensor 22 sends the control signal indicating that the light intensity 30A is above a predetermined light intensity threshold from front of the vehicle 12, then the microprocessor 24 instructs the first motor 26 such that the first connecting rod 28 is rotated about its axis to lower the sun visor 20 (open position P2) to block the light intensity 30A from entering the vehicle 12. It should be noted that the sun visor 20 might be raised or lowered (similar to position P1 and P2) when the sun visor 20 is in the side position P3. In order to raise or lower the sun visor 20 when it is at the side position P3, the microprocessor 24 may operate the first motor 26 and the second motor 27 simultaneously and operate the sun visor 20 to reach the side position P3 (up or lowered position).

In one implementation, the light intensity sensor 22 may detect the height of the passenger P in the sitting posture. Based on the height of the passenger P, the microprocessor 24 may determine length of face of the passenger P. Based on the profile i.e., height of the passenger P, the microprocessor 24 may determine operation (amount of tilting or lowering) of the sun visor 20 such that the light intensity 30A is blocked from falling on the face of the passenger P.

The microprocessor 24 continuously controls the position of the sun visor 20 based on the readings received from the light intensity sensors 22 such that the light intensity 30A is blocked from entering the vehicle 12 at all times. Whenever the light intensity sensor 22 detects that the light intensity 30A is not entering the vehicle 12, then the microprocessor 24 instructs the first motor 26 and the second motor 27 to retrieve the sun visor 20 to the folded position P1, as shown in FIG. 5.

As explained above, the sun visor 20 is operated to block the light intensity 30A from entering the driver or passenger side window and said driver or passenger side front windshield the without user intervention. Further, the microprocessor 24 controls the operation of the sun visor 20 based on the readings received from the light intensity sensors 22. As such, the microprocessor 24 does not have to depend on other data to control the sun visor 20 leading to faster processing of the readings to operate the sun visor 20.

Further, it should be noted that a single motor might be used to operate the connecting rod that will adjust the position of the sun visor. As such, the microprocessor will instruct the motor to rotate about its own axis or turn sideways such that the sun visor is adjusted to provide shade on face of the user.

As it is evident from above, the sun visor assembly can be operated without manual intervention, which will allow the driver to drive the vehicle without any disturbance. The sun visor assembly can be installed in existing vehicles as an auxiliary component or as an integral component of the vehicle at the time of the manufacturing. Further, the sun visor can be installed at driver side, passenger side or even at the back seats (rear side door windows) to block sunlight or light intensity from falling on passengers from all sides.

Although the disclosure is explained to have one microprocessor, it is possible to use more than one microprocessor to process the signals sent by the sensors and to control the operation/position of the sun visor.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A sun visor assembly for a vehicle, comprising:
a sun visor rotably and pivotally mounted inside a vehicle using a mounting bracket;
a rotation motor connected to the mounting bracket;
a tilting motor;
a microprocessor;
a selectively adjustable bidirectional light intensity sensor,
a first shaft coupled to said rotation motor, wherein said first shaft extends along a surface of said sun visor to then receive said rotation motor, a second shaft coupled to said tilting motor, wherein said second shaft extends from said tilting motor and attaches to an edge of said sun visor,
said microprocessor actuating said rotation motor and said tilting motor upon said sensor detecting a predetermined light intensity coming from said driver or passenger window, thereby defining a rotational path adapted to follow an optimal path that avoids said visor having an interior space, said tilting motor housed within said interior space, said second shaft extending from said tilting motor through said interior space out of the side of said sun visor and connected on its opposite end to said rotation motor, said microprocessor actuating said tilting motor to tilt said sun visor a certain angular distance depending on programmed ranges that correlate with the positioning of said sensor to detect a predetermined light intensity entering through said driver or passenger side front windshield, a home positioned defined as the sun visor being substantially parallel to the ceiling of the vehicle, said visor returning to the home position upon said sensor no longer detecting a programmed light intensity threshold coming from said driver or passenger side window and said driver or passenger side front windshield.

2. The sun visor assembly of claim 1, further comprises a voltage regulator configured to convert 12V coming from a vehicle battery to 5V delivered to said microprocessor functions and then said microprocessor sends corresponding signals to said motors, said rotation motor and said tilting motor being stepper motors.

3. The sun visor assembly of claim 1, wherein said motors have a tilting and rotating speed that can be programmed as designed by user.

4. The sun visor assembly of claim 1, wherein said microprocessor is located on said sun visor.

5. The sun visor assembly of claim 1, wherein said adjustable bi-directional light intensity sensor is a still camera, a video camera, a light sensor, or a photometer sensor.

6. The sun visor assembly of claim 1, wherein said first shaft rotates 90 degrees.

7. The sun visor assembly of claim 1, wherein said adjustable bi-directional light intensity sensor is mounted to a windshield of said vehicle.

8. The sun visor assembly of claim 1, further including a side position wherein said tilting motor actuates said sun visor to tilt sideways to engage in said side position.

9. The sun visor assembly of claim 1, further including an open position wherein said rotation motor actuates said sun visor to lower said sun visor to engage in said open position.

10. A system for a sun visor assembly, consisting of:
a) a vehicle having a dashboard and a windshield, a sun visor having a rectangular shape mounted within said vehicle, wherein said sun visor rests against a surface of said windshield, wherein said sun visor is removably coupled to a roof of said vehicle through a hook, a plurality of light sensors mounted to a roof of said vehicle, wherein said plurality of light sensors include a still camera, a video camera, a light sensor, or a photometer sensor, a microprocessor mounted directly on said sun visor;
b) a first motor and a second motor mounted within said vehicle, wherein said first motor is a rotation motor, wherein said second motor is a tiling motor, wherein said second motor includes a mounting bracket and is coupled to said roof of said vehicle, wherein said first motor is mounted on said sun visor, wherein said first motor and said second motor are both step motors;
c) a first shaft and a second shaft, wherein said first shaft is coupled to said first motor and extends along a surface of said sun visor, wherein said second shaft is coupled to said second motor and extends outwardly from said second motor to attach to an outer edge of said sun visor;
d) a first position being a home position, wherein said first position is a folded position that is engaged when said plurality of sensors detect an absence of light intensity;
e) a second position being an open position, wherein said first motor engages said first shaft to be rotated and lower said sun visor to engage in said open position; and
f) a third position being a side position, wherein said second motor engages said second shaft to tile said sun visor towards a side window of said vehicle to engage in said side position.

* * * * *